Sept. 15, 1931.   L. TACKE   1,823,632
MACHINE FOR COVERING IRREGULARLY SHAPED
PAPER BOX COVER PLATES AND THE LIKE
Filed Feb. 16, 1929   12 Sheets-Sheet 2
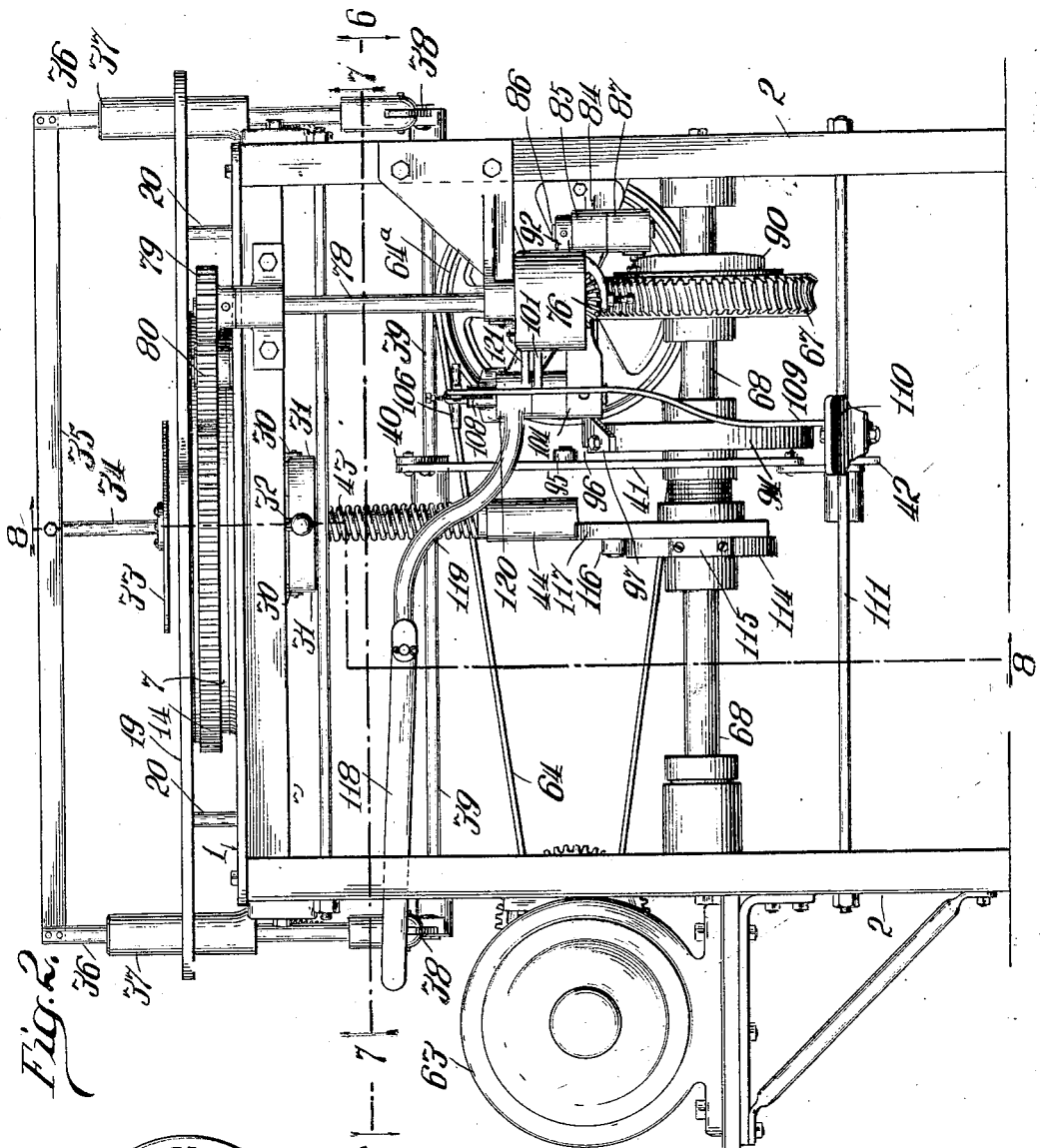
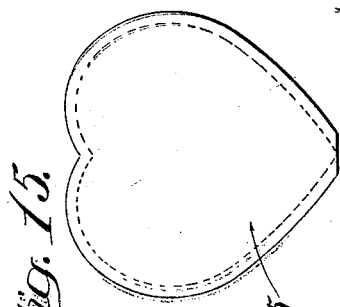
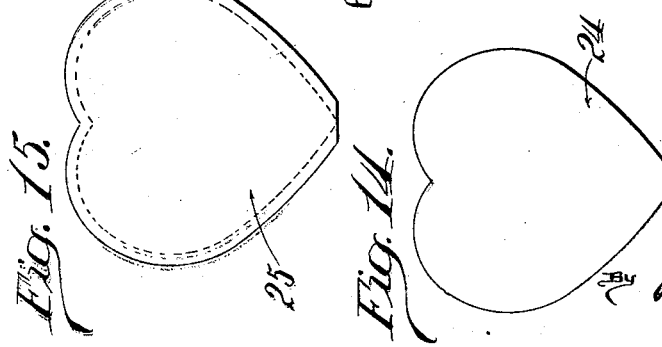
Inventor
Louis Tacke
Attorney

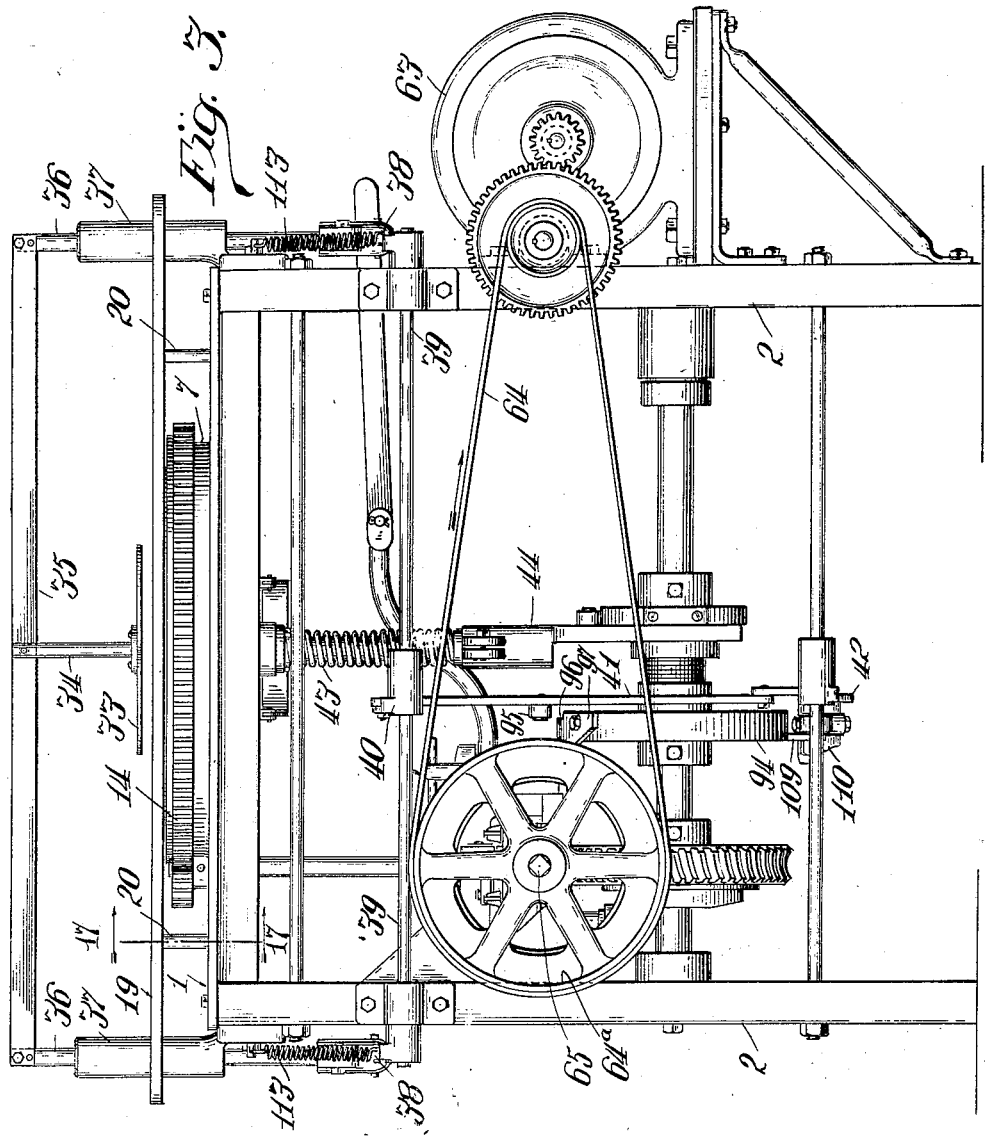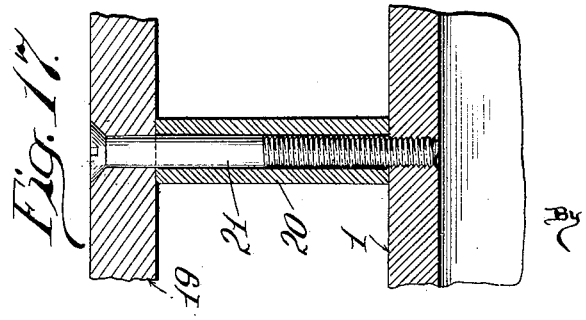

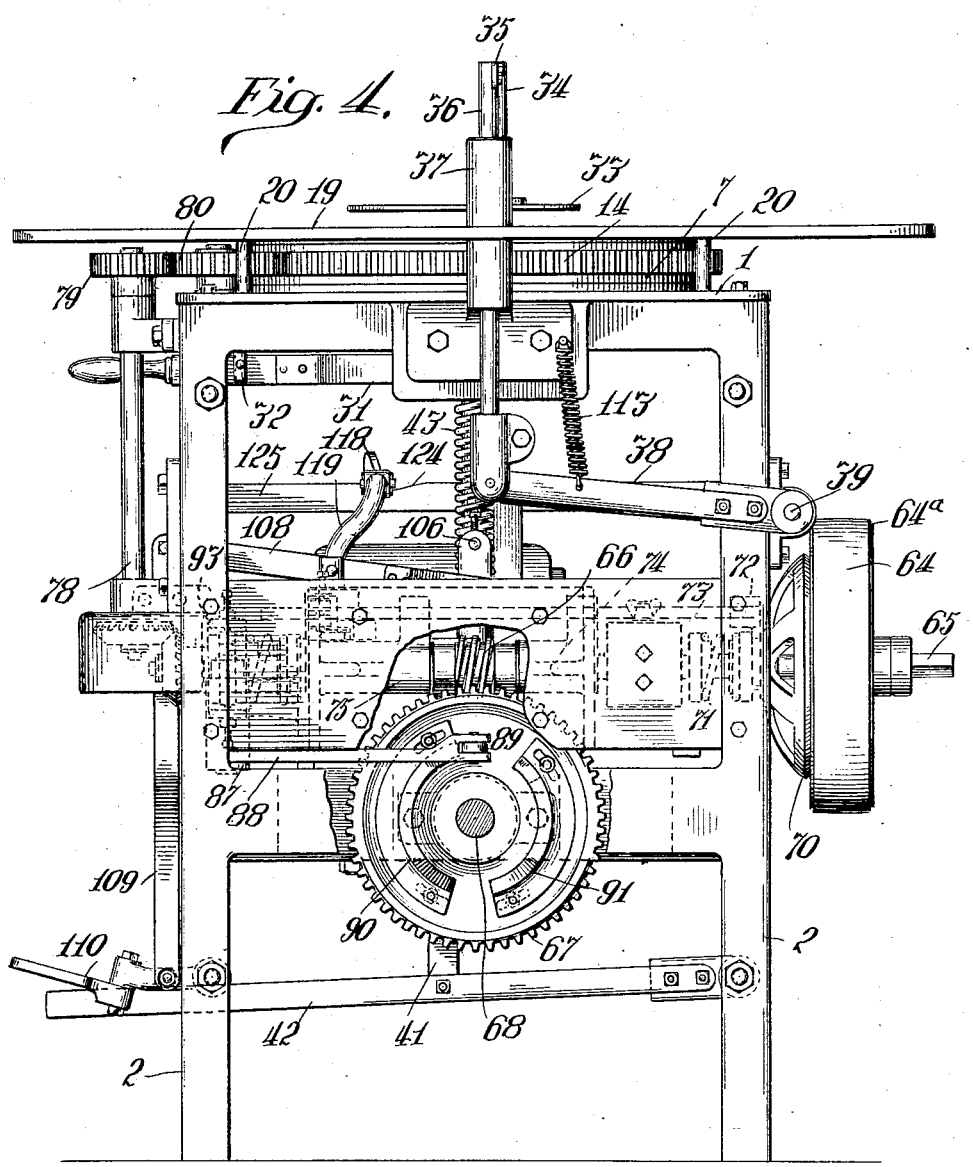

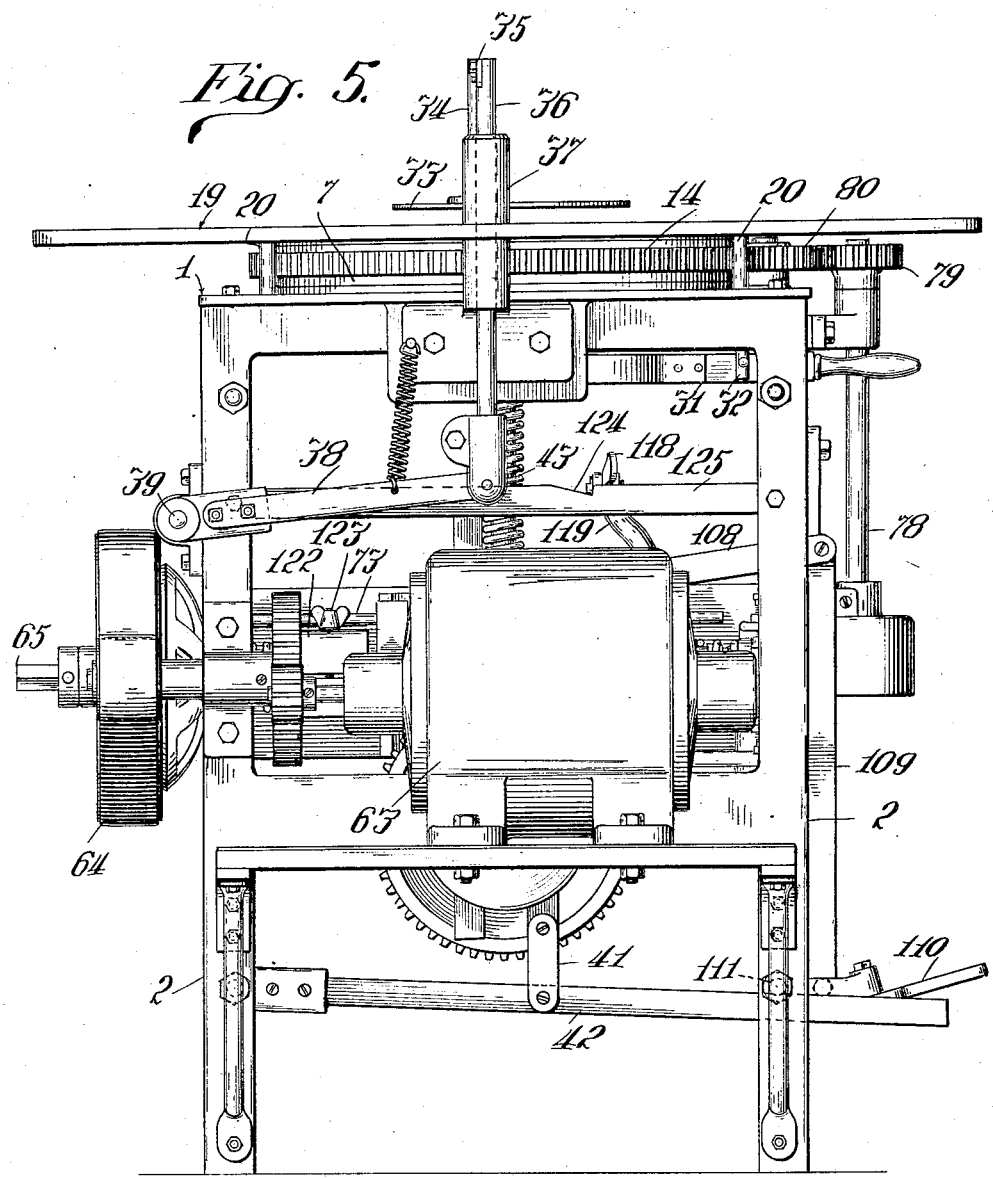

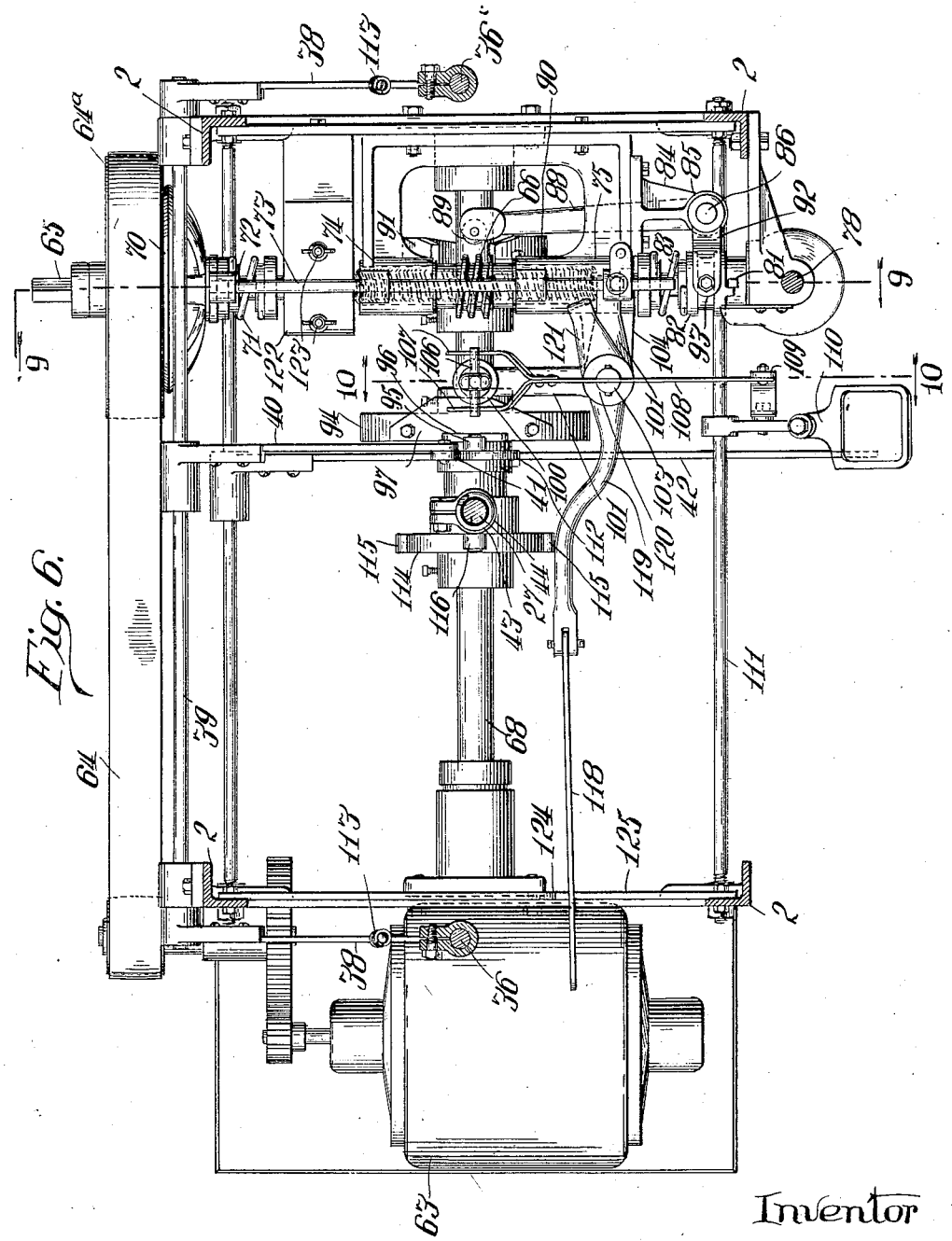

Sept. 15, 1931. L. TACKE 1,823,632
MACHINE FOR COVERING IRREGULARLY SHAPED
PAPER BOX COVER PLATES AND THE LIKE
Filed Feb. 16, 1929 12 Sheets-Sheet 7
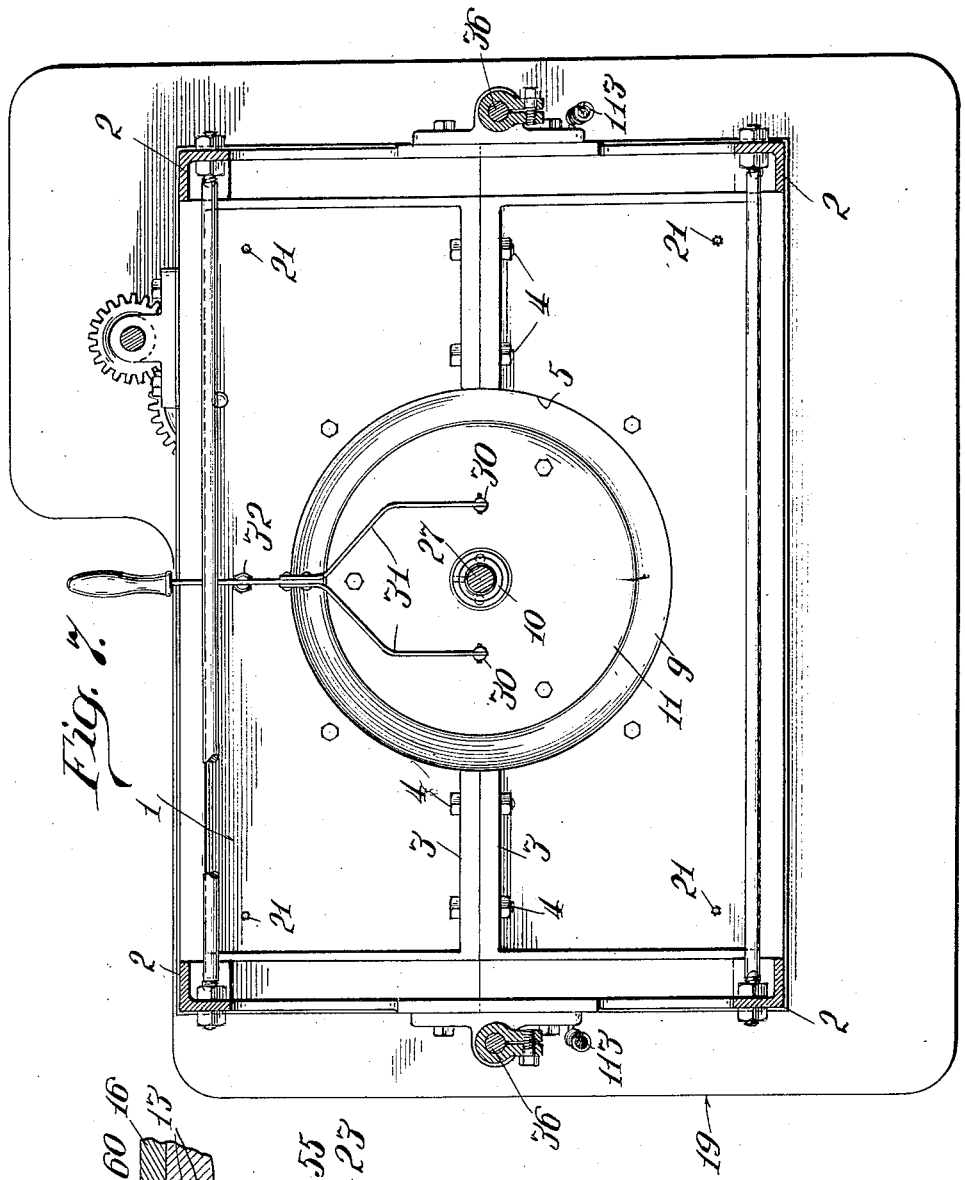
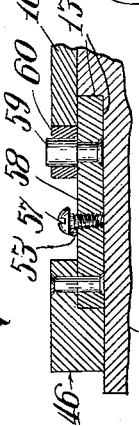
Inventor
Louis Tacke
By Rudolph Wm. Lotz
Attorney.

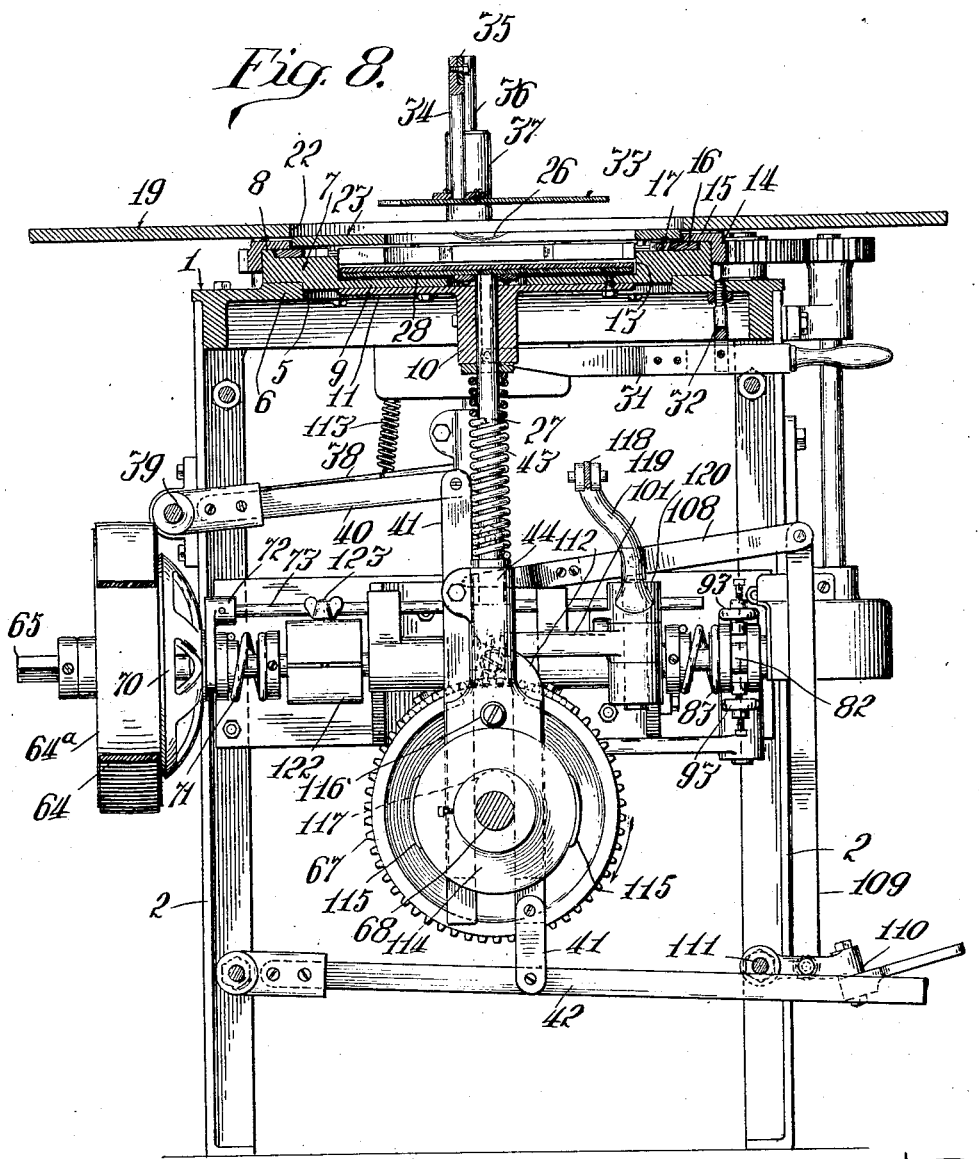

Sept. 15, 1931. L. TACKE 1,823,632
MACHINE FOR COVERING IRREGULARLY SHAPED
PAPER BOX COVER PLATES AND THE LIKE
Filed Feb. 16, 1929 12 Sheets-Sheet 9
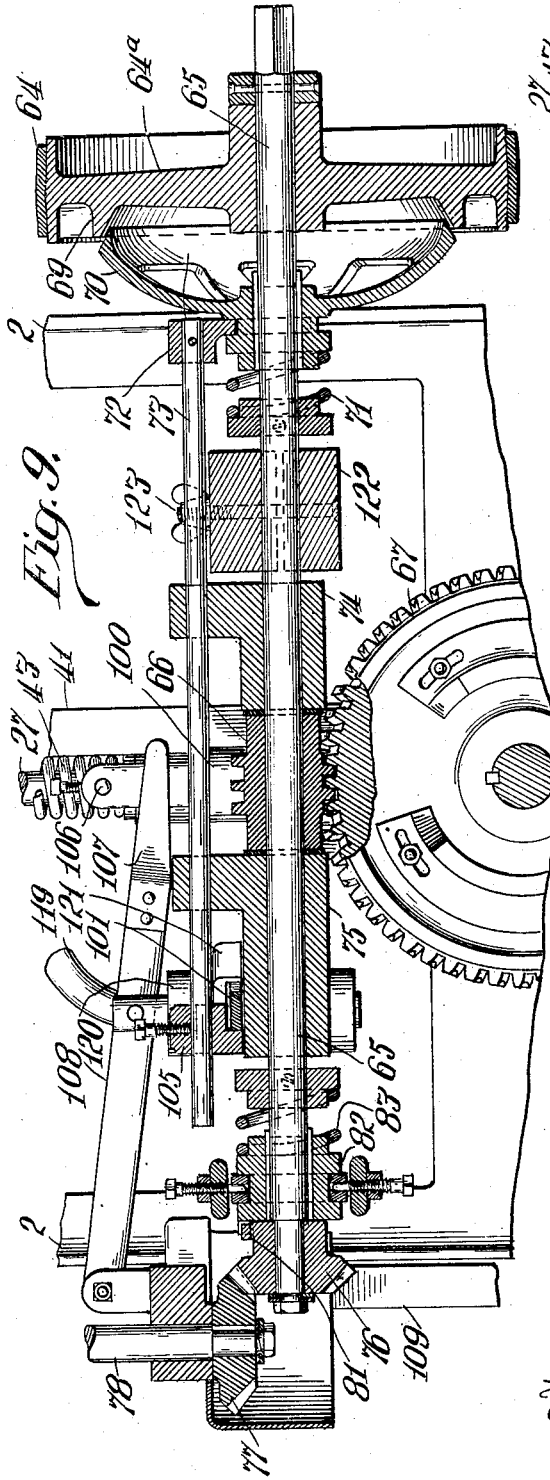
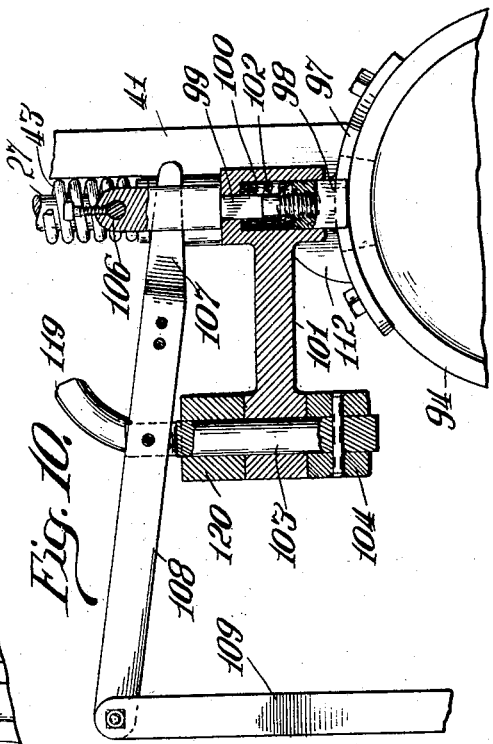
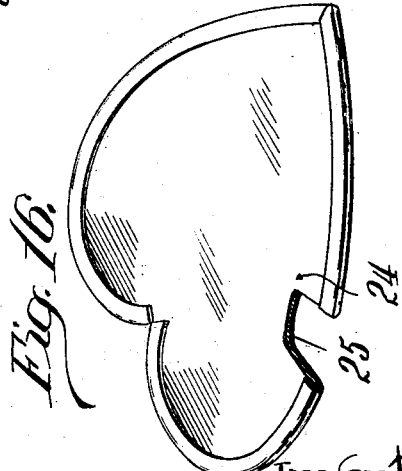
Inventor
Louis Tacke
By Rudolph Wm Lotz
Attorney.

Inventor
Louis Tacke

Sept. 15, 1931.  L. TACKE  1,823,632
MACHINE FOR COVERING IRREGULARLY SHAPED
PAPER BOX COVER PLATES AND THE LIKE
Filed Feb. 16, 1929   12 Sheets-Sheet 11
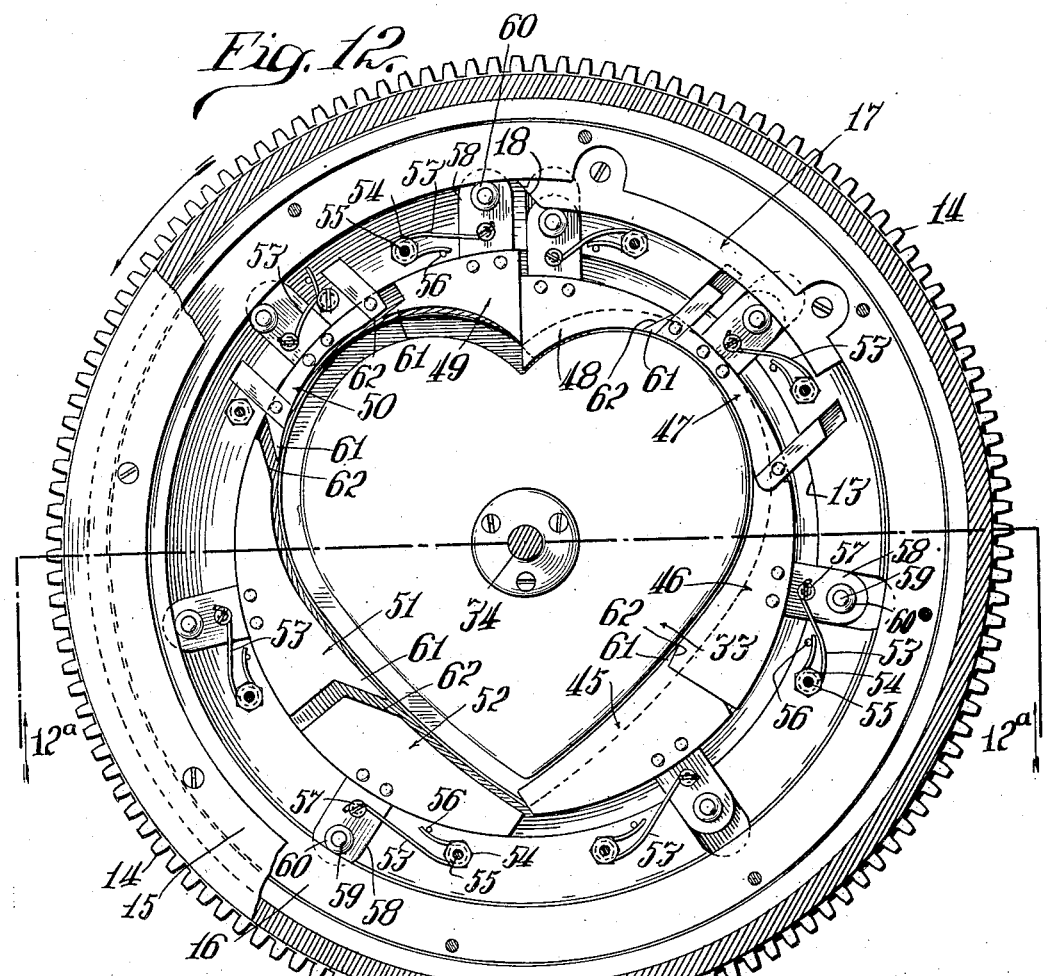
Fig. 12.
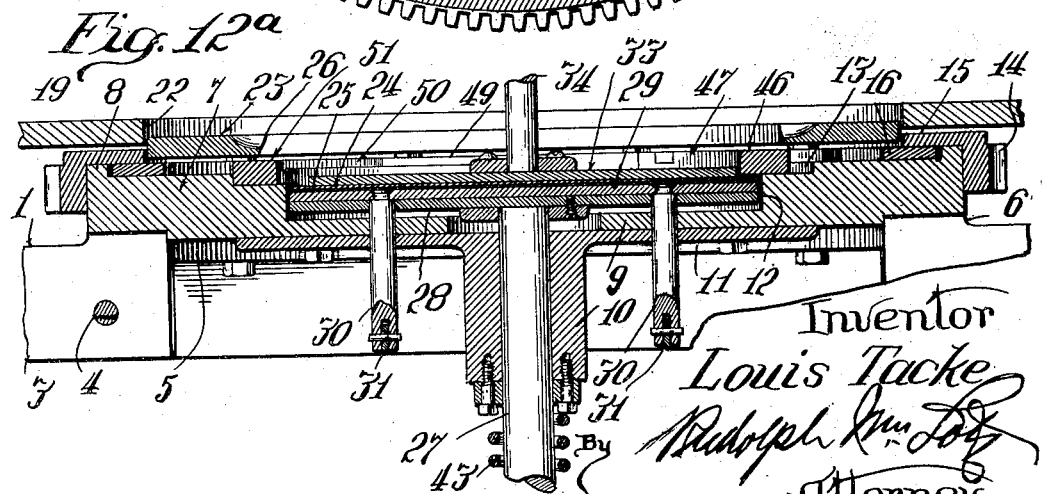
Fig. 12ª
Inventor
Louis Tacke
By Rudolph Im Lot
Attorney.

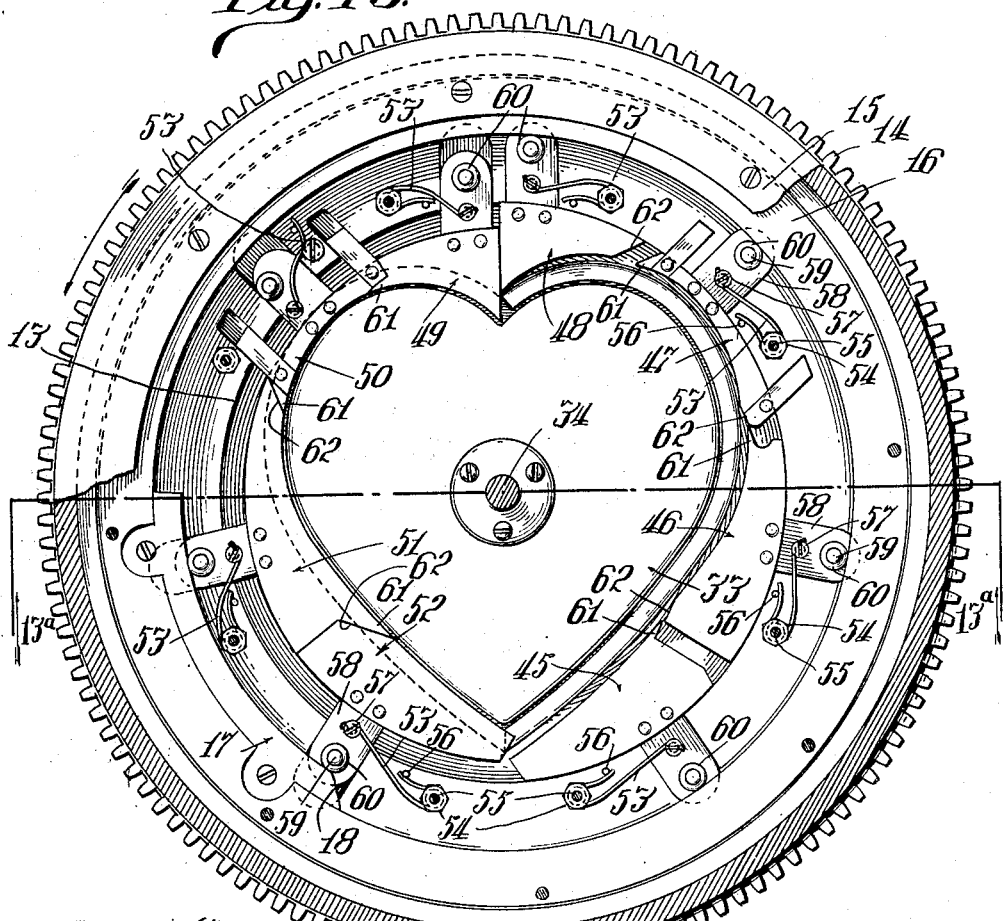
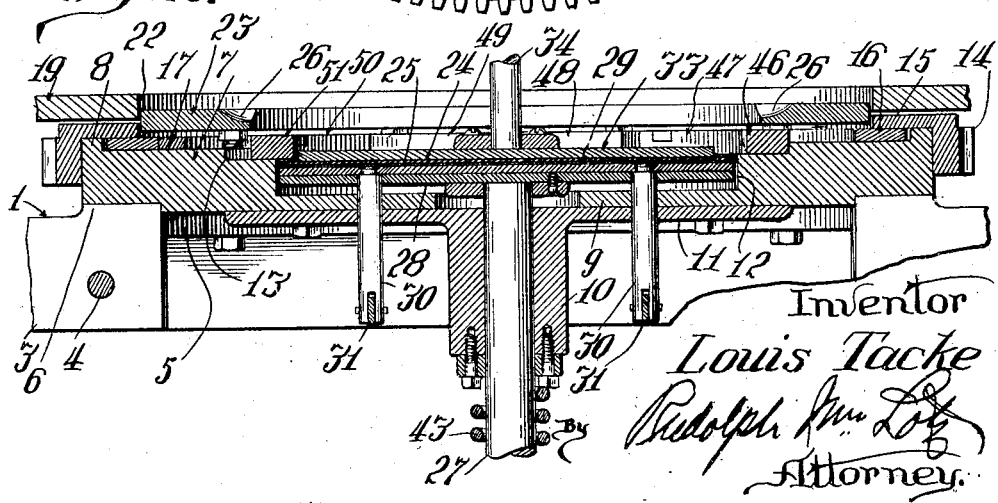

Patented Sept. 15, 1931

1,823,632

UNITED STATES PATENT OFFICE

LOUIS TACKE, OF BROOKLYN, NEW YORK, ASSIGNOR TO H. SCHULTZ & COMPANY, OF CHICAGO, ILLINOIS, A CORPORATION OF ILLINOIS

MACHINE FOR COVERING IRREGULARLY SHAPED PAPER BOX COVER PLATES AND THE LIKE

Application filed February 16, 1929. Serial No. 340,484.

This invention relates to machines used in the paper box industry and particularly to a machine for mounting upon the top walls of covers of paper boxes, such as heart or other fancifully shaped paper boxes, used mainly for containing confections, a cover material consisting usually of silk, satin or fancy paper.

Heretofore so called "fancy" candy or other paper boxes have been made almost entirely by hand and this is true particularly of the covers of said boxes, the top plates or walls of which are covered with either a suitable textile fabric or fancy paper before the rims of said covers are secured to said top plates. The latter are usually die-cut and then laid upon a piece of covering material of the same shape but of larger size so as to provide a sufficiently wide marginal portion to receive a layer or coating of adhesive and be then folded over the peripheral edge of said plate and cemented to the under face of the now inverted plate. The material of the said marginal portion of the fabric or fancy paper becomes gathered or somewhat pleated upon the under face along the marginal portion of the inverted plate and care must be exercised to effect such a distribution of the folds or pleats of the marginal portion of the fabric or paper as will obviate undue bunching at any point as this interferes with the proper application of the flange or rim to said plate adjacent its marginal edge and upon the now pleated marginal edge portion of the fabric or paper. Great care must also be exercised to prevent any of the adhesive material used from being applied to the fabric or paper inwardly of the said marginal edge portion as this would show and constitute a serious flaw in the appearance of the finished box such as would require waste of the plate and fabric or paper with which it is covered.

This hand labor is very slow and expensive and, in view of the high cost of the fabrics most commonly used, waste is very costly.

Hence the general object of my invention is to provide a machine for performing some of the hand operations involved in producing the covered top plates of fancy boxes of unusual shapes and, for purposes of illustration, I have, in the accompanying drawings, illustrated a machine for covering top plates of heart shape as this is one of the most popular designs but I desire it to be understood that the machine may be readily adapted to other shapes and designs without departing from the invention.

The particular purposes and objects of the invention will be best understood from the following specification.

In the accompanying drawings illustrating a suitable embodiment of the invention:

Figs. 2 and 3 are side elevations of the same seen from opposite sides of the machine.

Figs. 4 and 5 are end elevations seen from opposite ends of the machine.

Figs. 6 and 7 are, respectively, plan sections of the machine on the lines 6—6 and 7—7 of Fig. 2.

Fig. 8 is a vertical section on the line 8—8 of Fig. 2.

Figs. 9 and 10 are detail vertical sections on the lines 9—9 and 10—10, respectively, of Fig. 6.

Figure 11:
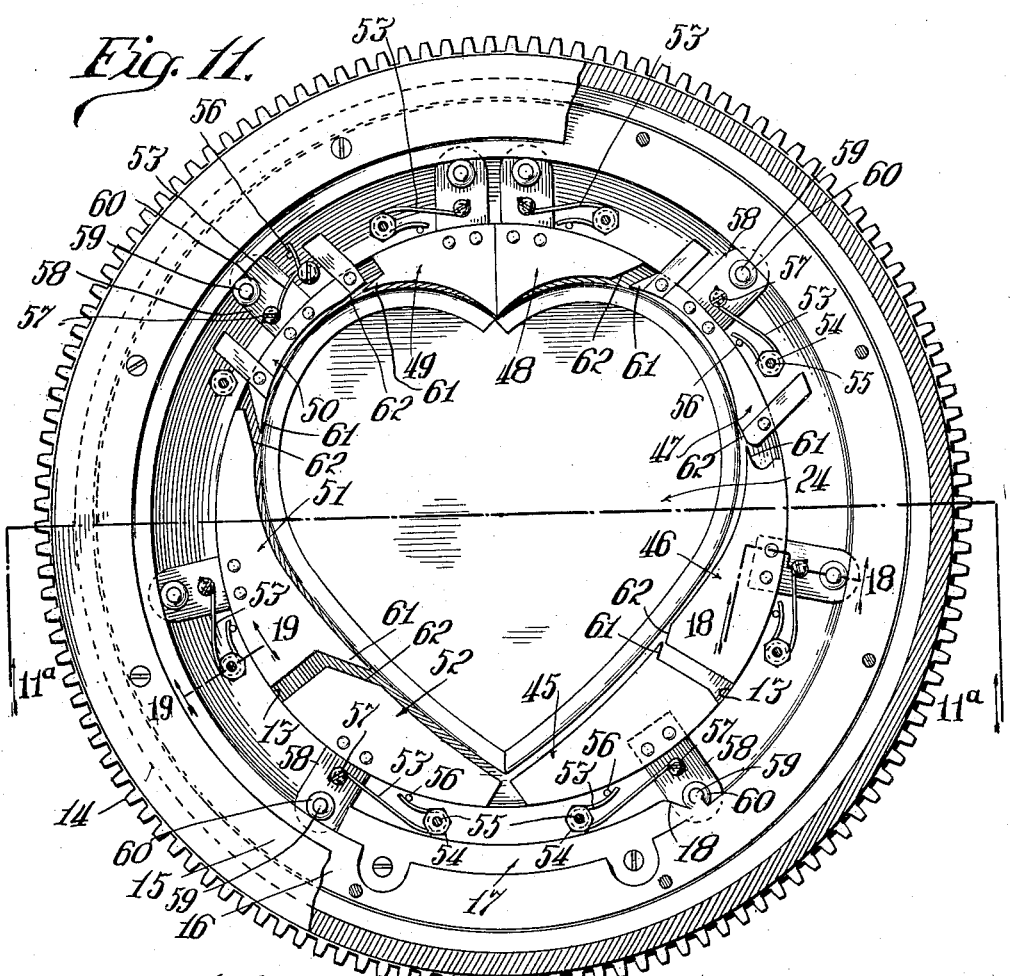
Figure 11A:
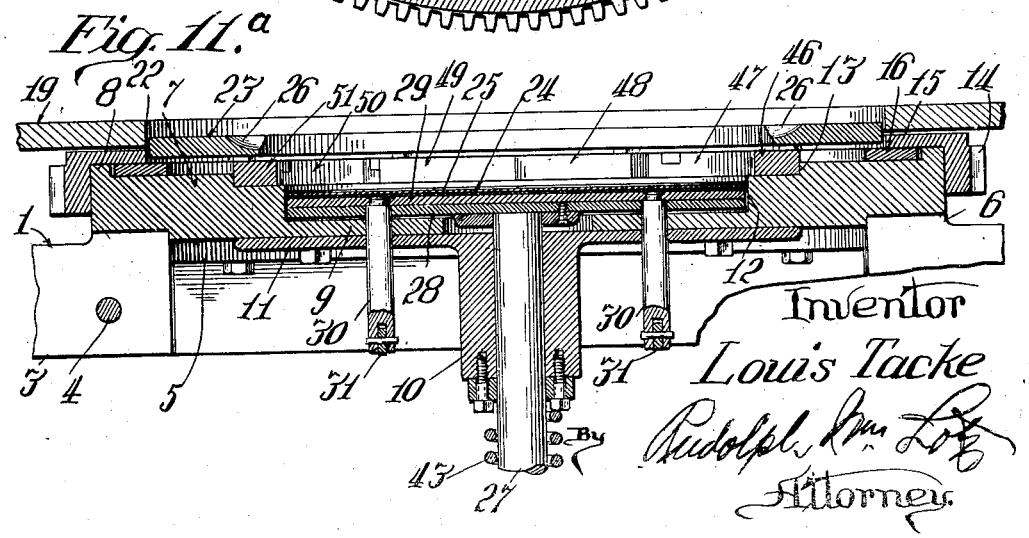

Figs. 11, 12, and 13 are plan views, partly in section, showing the main operating mechanism of the machine in various different positions.

Figs. $11^a$, $12^a$, and $13^a$ are, respectively, detail sectional views on the lines $11^a$—$11^a$, $12^a$—$12^a$, and $13^a$—$13^a$ of Figs. 11, 12, and 13.

Figs. 14 and 15 are, respectively, plan views of the top plate of the cover of a box and the sheet of fabric or paper to be mounted thereon.

Fig. 16 is a perspective view of an inverted and covered top plate of a box cover.

Fig. 17 is a detail vertical section on the line 17—17 of Fig. 3.

Figs. 18 and 19 are, respectively, detail sectional views on the lines 18—18 and 19—19 of Fig. 11.

Figure 1:
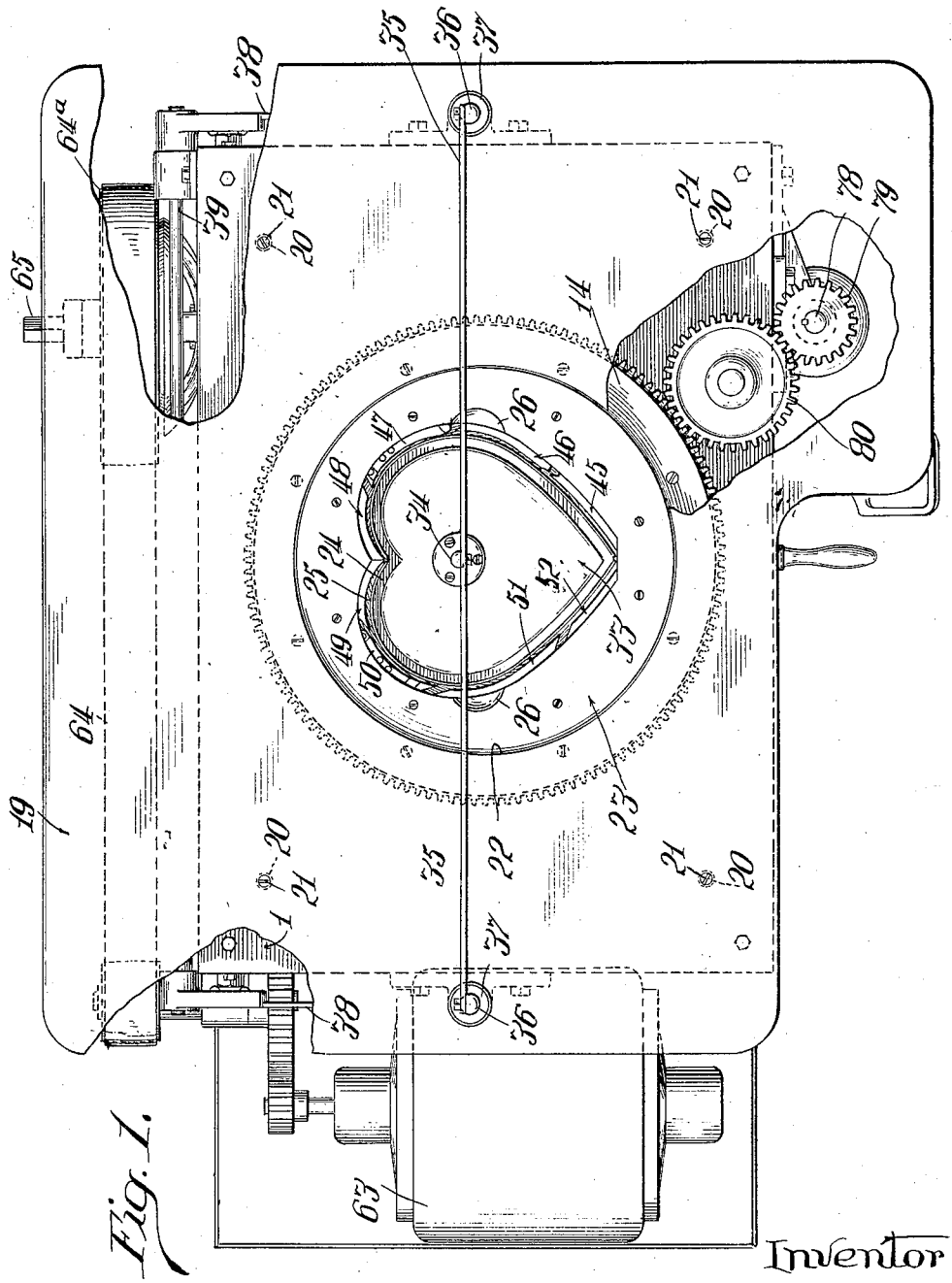
Fig. 1 is a top plan view of a machine constructed in accordance with the invention.

Referring first to Figs. 1 and 2, it will be noted that the machine includes a substantially rectangular table-like structure comprising the table-plate 1 supported at its four corners on legs 2 conveniently made of conventional angle bars. By reference to Fig. 7, it will be noted that the plate 1 is composed of two equal, preferably cast, parts having meeting flanges 3 through which coupling bolts 4 pass.

Referring now to Figs. 7, 8, and 11ª, it will be seen that the plate 1 is provided with a central circular opening of large diameter, the annular wall of which is indicated by ordinal 5.

An annular shoulder 6 borders the wall 5 on the top face of the plate 1 and upon this shoulder there is rigidly mounted a ring-member 7 secured thereto by means of machine screws. The ring-member 7 is provided on its upper face with an annular rib 8 having its outer circumferential face flush with that of said member 7. The latter is provided on its lower face with an annular shoulder opposed to and engaging the wall 5 of the opening in the plate 1, this shoulder being practically the circumferential edge of an inwardly projecting annular flange 9 which partially fills said opening and constitutes a support for the bearing 10, the annular flange 11 of which is bolted to the said flange 9. Thus the ring-member 7 presents a central circular recess of which the flange 9 forms the bottom, said recess having an annular wall 12 which is bordered by an annular recess 13 cut into the top face of said ring-member 7.

The latter constitutes a bearing for the ring spur gear 14 which is provided with an inwardly extending annular flange 15 riding upon the flange 8. To the bottom face of the flange 15 there is secured a flat ring 16 which may be said to ride upon the upper face of the member 7 just inwardly of the flange 8. The ring 16 carries an arcuate cam-member 17 having an inner face concentric with the axis of the gear 14 and having a beveled end 18.

Disposed above and parallel with the plate 1 is a plate 19 supported upon spacing sleeves 20 through which the bolts 21 pass. This plate has a large, substantially central, circular opening 22 concentric with the central opening 5 of the plate 1 and of a diameter substantially the same as that of the opening bordered by the flange 15 of the gear 14. Suitably secured to the member 7 within the opening 22 of the plate 19 and projecting into the opening bordered by said flange 15 of the gear 14, is a plate 23 having a substantially central opening which corresponds in shape with the plate 24 (Fig. 14) to be covered but is of larger dimensions than the latter and corresponds in the latter substantially with those of the sheet 25 (Fig. 15) of the covering material for the plate 24. This opening in the plate 22 is bordered by two recesses 26 to receive the tips of the operator's fingers.

The recess in the ring-member 7 bordered by the wall 12 is of the shape and size of the plate 24 which it is adapted to receive and is, of course, concentric with the opening 22 of the plate 19 (see Fig. 1).

Vertically reciprocable in the bearing 10 is a plunger 27 which carries a plate 28 of the shape and size of the plate 24 and which is at all times disposed in the recess of the ring-member 7. Disposed upon the plate 28 is an ejector plate 29 of the same shape and size as said plate 28 and to which the upper ends of a pair of plungers 30 are secured, the latter passing through guide openings in the flange 9 and plate 28 and being associated at their lower ends with the ends of the arms of a forked hand-bar 31 pivotally supported between its ends upon a frame element 32 (Fig. 8).

A presser plate 33 of the shape but of smaller dimensions than the plates 14, 28 and 29 is carried by the plunger 34 which is axially aligned with the plunger 27 and is carried by the cross-bar 35 spanning the plate 19 and secured at its ends to a pair of vertically reciprocable plungers 36 (Figs. 1 and 2) mounted in sleeve bearings 37 carried by said plate 19. At their lower ends said plungers 36 are pivotally associated with the crank-arms 38 of a rock-shaft 39. The latter is provided between its ends with a crank-arm 40 associated by means of a link 41 with a lever 42 between the ends of the latter. Said lever 42 is pivotally secured at one end to the machine frame (Fig. 8), so that by depressing its other end the plunger 34 and plate 33 will be forced down until the latter bears upon the ejector plate 29.

A spring 43 about the plunger 27 and engaging a collar 44 (Fig. 2) on the latter, maintains the same normally at the lower limit of its movement.

The first operation is necessarily the step of feeding the machine. This is preceded by first placing a plate 24 upon a covering or coating sheet 25 to the marginal edge of which plastic adhesive is applied, the time and manner of such application being immaterial. This disposition of the plate 24 upon the sheet 25 may and preferably is preceded by disposing the sheet upon the ejector plate 29 which remains in raised position following its last preceding actuation by the hand lever 32. After both the sheet 25 and the plate 24 are thus properly disposed upon the ejector plate 29, the lever 42 is depressed to thus clamp the elements 24 and 25 upon and force the plate 29 down upon the plate 28. As this carries these elements 24 and 25 into the recess of the member 7 bordered by the wall 12 and as said recess is smaller than the element 25, it follows, of course, that the marginal portion of the latter is turned up and projects above the level of the bottom of the recess 13 of said member 7.

The top face of the plate 24 is now disposed very slightly below the plane of the bottom of the recess 13 to allow space between said plane and the top of the plate 24 to receive the marginal portion of the element 25 when the same is turned in and thus folded over upon the marginal portion of the top face of said plate 24.

Obviously the next succeeding step or operation required is that of folding or turning in the marginal portion of the element 25 and must be succeeded by the application of pressure thereon for obvious reasons.

The turning in or folding over of the marginal portion of the element 25 upon the plate 24 is effected by a series of cam elements radially reciprocably mounted in the recess 13 of the member 7, said cam elements consisting of two sets, each comprising a plurality thereof which are shown in detail in Figs. 11, 12, and 13 and the companion sectional views 11$^a$, 12$^a$, and 13$^a$.

Referring now to Fig. 11, wherein the said cams are shown in initial position, it will be seen that at the right are four cam members 45, 46, 47, and 48, comprising one of the two sets, and at the left are the four similar cams 49, 50, 51 and 52, comprising the other set.

Each of these cams has an arcuate outer edge lying and held normally in contact with the outer wall of the recess 13 of the member 7 by means of springs 53 coiled about spacing members 54 (Fig. 19) mounted in threaded openings in the member 7 and upon which the member 23 rests, the latter being secured to the spacing members 54 by means of the machine screws 55, said springs being also engaged with pins 56 on the member 7 and with screws or projections 57 on the stem members 58 of the respective cams 45 to 52 inclusive.

The stem members 58 consist of flat plates riveted at one end each to the said respective cams and lie upon the bottom of the recess 13 of the member 7. At their other ends said stem members carry stud shafts 59 upon which anti-friction rollers 60 are mounted (for details see Fig. 18), the said members 58 being mounted in suitable guides (not shown).

The inner edge portions of the cams 45 to 52 inclusive are, in the instant case, so disposed relatively to each other as to describe, cooperatively, substantially the shape of the plate 24 and the recess of the member 7 receiving the same. In the normal positions of said cams as shown in Fig. 11, the said inner edges are disposed slightly outwardly of the peripheral wall of the recess of the member 7 receiving the plate 24 and element 25. In this normal position the ends of the cams are also spaced from each other and it will be noted that the cams 45, 46, and 47 of one set and the cams 49, 50, and 51 of the other set are provided each at one end with a wedge-shaped projection 61. The cams 46, 47, and 48 of one set and the cams 50, 51 and 52 of the other set are cut away each at the end opposing the next preceding cam, as at 62, to receive the projections 61 of the companion cams as said respective sets of said cams are moved to the position shown in Figs. 12 and 13 by the cam 17 of the ring-gear 14 during rotation of the latter.

By reference to Fig. 11 it will be noted that the anti-friction rollers 60 of the cams 45 and 52 are so spaced from each other that the cam 17, lying between them, engages neither of them. But the spacing of the anti-friction rollers 60 of the cams 45—46, 46—47, 47—48, et sep. is very appreciably less than the arcuate length of the cam 17 so that as the latter moves from the position of Fig. 11 clockwise, it will first move the cam 45 to its inward position and will hold it while it moves cam 46 to its inward position. After the cam 46 is in this position, the passage of the cam 17 out of engagement with the roller 60 of cam 45 would permit the latter to be spring returned to normal position but the shoulder 62 of cam 46 is now disposed in the path of the projection 61 of cam 45 and prevents return movement of the latter. For the same reason the cam 46 is retained at its inner position by the cam 47 and the latter by the cam and this entire set is thus held at the inner limit of its movement until the cam 17 has passed the roller 60 of the cam 48 whereupon the whole set is spring returned to initial position. The other set of cams functions similarly and as each cam moves inwardly, it turns down the upstanding marginal edge portion of the covering material for the plate 24 (element 25) to overlap the now upper face of the inverted plate 24 and so holds it.

The mechanism which I will now proceed to describe functions to rotate the ring gear 14 intermittently.

The initial rotation of the ring gear 14 is from the position of the cam 17 in Fig. 11 to its position in Fig. 12, then from its position in Fig. 12 to its position in Fig. 13, and from the last-mentioned position to the position of Fig. 11.

During the period of rest of the cam 17 in the position of Fig. 12 and the consequent position of the cams 45 to 48 inclusive, the plunger 27 is moved upwardly to thus compress the inturned marginal portion of the covering element 25 down upon the plate 24. After a very brief interval, the plunger 27 moves downwardly and the rotation of the cam 17 to the position of Fig. 13 is effected. Then the plunger 27 is again raised and, after a very brief interval, is dropped and, thereupon, the cam 17 is returned to the position of Fig. 11.

The machine now stops automatically and permits the operator to eject the finished piece of product and refeed the machine.

The intermittent movement of the cam 17 is effected by means of two cams and two clutches and the automatic stopping of the operation of the machine is controlled by a third cam.

In order that the construction and operation of the mechanism disposed below the plate 1 may be most readily understood, the several elements will be followed through from the motor or other source of power 63. This is associated by means of gears, pulleys and the belt 64 with a shaft 65 (Figs. 6 and 9) which carries the worm 66 meshing with the worm-wheel 67 on the shaft 68 which constitutes the main shaft of the machine. The pulley 64$^a$ is loose and carries a clutch-member 69 adapted for engagement by the clutch-member 70 which is slidable but non-rotatable on the shaft 65 and is held by the spring 71 normally engaged with the clutch-member 69. A fork 72 on a plunger rod 73 engages in an annular groove in the hub of the clutch-member 70 and is reciprocated to throw the latter into and out of engagement with the member 69.

The shaft 65 is journalled in bearings 74 and 75, and at its other end it carries a bevel or mitre gear 76 which is rotatable thereon and meshes with a companion gear 77 on the vertical shaft 78 which is geared to the ring-gear 14 by means of the pinion 79 and idler 80 (Fig. 1).

The gear 76 carries a tooth-clutch member 81 while the shaft 65 carries a slidable and non-rotatable companion tooth-clutch member 82 which is held by the spring 83 normally in mesh with the member 82.

Suitably mounted on the machine frame by means of the bracket arm 84 is a bearing 85 for a vertical rockshaft 86 (Figs. 2 and 6). Upon the lower end of this shaft there is rigidly mounted the elbow portion 87 of a bell-crank lever having a long arm 88 carrying an anti-friction roller 89 disposed for engagement by face cam elements 90 and 91 mounted upon the worm-gear 67. This bell-crank lever also has a short arm 92 terminating in a fork 93 associated with the tooth-clutch member 82.

The cam members 90 and 91 are diametrically opposed arcuate elements suitably bolted to the face of the worm-wheel 67 as shown in Fig. 4 to permit them to be arcuately adjusted on said worm-wheel. Both said members have beveled end portions sloping toward the face of the worm-wheel 67 and which may be termed the "low" points while the intermediate portions may be termed the "high" points.

The spring 83 maintains the clutch member 82 in mesh with the clutch-member 81 and thus also serves to hold the roller 89 of the bell-crank lever in engaging relation to said cam members 90 and 91. When said roller is disposed between opposed low points in the said cam members, the clutch members 81 and 82 will be in mesh and one of these points is so engaged by the said roller 89 when the cam member 17 of the ring gear 14 is disposed in the position of Fig. 11, but at this time the machine will not normally be in operation because the clutch 69—70 will be out but as soon as said clutch 69—70 is in, the worm-wheel will make a complete revolution so that while the roller 89 rides upon the high points of the cams 90—91, the cam 17 of ring-gear 14 will remain at rest in the respective positions of Figs. 12 and 13.

On the shaft 68 there is also mounted a cam 94, which (Fig. 6) is provided in the face opposing the motor 63 with an annular groove which is accessible to a roller 95 through the radial recess 96. Mounted upon the circumferential face of the cam 94 is a cam plate 97 in which the recess 96 is shown and which presents a substantially V-shaped projection overhanging the other face of said cam. In the outermost portion of this projection there is a recess in which the roller 98 is adapted to engage, as shown in detail in Fig. 10. Said roller 98 is rotatably mounted upon the lower end of a plunger 99 vertically reciprocable in a sleeve or socket 100 at the end of one arm of a bell crank lever 101 and is normally maintained in engaging relation to the plate 97 by means of the spring 102.

The elbow portion of the lever 101 is mounted on a shaft 103 carried by a bracket arm 104 of the frame (not clearly shown). The other arm of said lever 101 engages the collar 105 of the plunger rod 73, the roller 98 is also normally held in engaging relation to the plate 97 by means of the spring 71.

The plunger 99 (Figs. 6, 8, and 10) is provided at its upper end with a cross-pin 106 disposed in the path of the forked end 107 of the lever 108 which is pivotally mounted between its ends on the shaft 103. The other end of said lever 108 is connected by means of the link 109 with the foot lever or treadle 110 pivotally mounted on the rod 111 of the frame. The lever 42 is disposed in the path of the treadle 110 and the rod 111 constitute a stop for limiting the upward movement of said lever 42.

Upon depressing the treadle 110, the roller 98 will be thrown up out of engaging relation to the cam plate 97 whereupon the spring 71 will act to throw in the clutch 69—70 to start the machine. It will be noted that there is a lost-motion of the fork 107 before it engages the pin 106 and, as above stated, that the lever 42 lies in the path of and, as shown in Fig. 8, is disposed in contact with said treadle 110.

The roller 95 is mounted between the ends of the forked plunger 112 (and just above the fork thereof) which, together with the link 41 connects lever 42 with the crank-arm 40 of the shaft 39. The fork of the plunger 112 constitutes a guide element engaging the shaft 68.

As the treadle 110 is depressed and the lever 42 swung downwardly, the first function performed will be to throw the roller 95 through the recess 96 into the groove of the cam 94 and, by reason of the lost-motion of the fork 107 of the lever 108, the second function will be to throw the roller 98 out of engaging relation to the cam plate 97 to thus throw in the clutch 69—70 thus starting the machine. The treadle 110 is practically instantly released as the throwing in of said clutch instantly starts the shafts 65 and 68. The roller 95 is almost instantly engaged in the groove of the cam 94 (said groove being circular) and thus maintains the lever 42 depressed thus holding the presser plate 33 at the lower limit of its movement.

A spring or springs 113 associated with the crank-arms 38 of the shaft 39 serves to hold the lever 42 and the plunger 112 normally at the upper limits of their movement so that when the recess 96 of cam 94 again reaches its initial position, the said roller will make its escape from said cam and, at the same instant, the roller 98 will have ridden to the outermost point of the cam plate 97 and have thus actuated the bell-crank lever 101 to throw out the clutch 69—70, to thus automatically stop the machine.

On the shaft 68 is a third cam 114 consisting substantially of an ordinary pulley provided on its circumferential face with two diametrically opposed arcuate projections 115. This cam 114 is disposed below the plunger 27 which carries an anti-friction roller 116 bearing upon said cam.

The arcuate projections 115 are adapted to raise the plunger 27 against the action of the spring 43 to cause the plate 28 and the ejector plate to compress the plate 24 and marginal covering material 25 against the respective sets of cams 45 to 48 and 49 to 52 as said sets become disposed at their inner positions as previously described. These upward movements of the plunger 27 are made while the plunger 34 is held at the lower limit of its movement but, by reason of the length of the cross-bar 35 and the crank-arms the latter will yield sufficiently to permit the slight upward movements required of the plunger 27.

For guiding the plunger 27 the same is provided at its lower end with a fork 117.

From the foregoing it will be seen that after depressing the treadle 110 the machine will operate until the shaft 68 has made one complete revolution. Occasion may arise to make it desirable to prevent operation of at least some of the cams 45 to 52 inclusive, to prevent breakage as by reason of paper being improperly positioned and therefore causing a jamming of the mechanism requiring practically instant stopping of the operation of the last-mentioned cams. To this end I provide a hand lever 118 which is pivotally associated with the arm 119 of a bell-crank lever which is pivotally mounted at its elbow portion 120 on the upper end portion of the shaft 103 and the other arm 121 of which is engaged with the short arm 101 of the bell-crank lever 101 to permit the latter to be manually operated to throw out the clutch 69—70.

In order to assure instant stoppage of the rotation of the shaft 65 as said last-named clutch is thrown out, there is engaged with said shaft a brake 122 composed of a pair of blocks of wood or the like clamped upon said shaft by means of bolts 123, a strap connected with said blocks being secured at its other end to the machine frame to prevent rotation of the brake 122. As the shaft 65 is at rest for as long or longer periods than it is in operation, this brake will not heat or burn under the influence of the friction to which it is subjected as will be obvious.

The hand lever 118 when moved to throw out the clutch 69—70 will engage in a notch 124 in a cross-bar 125 to prevent throw-in of said clutch.

Review of operation

The operation of all mechanism disposed upon and above the plate 1 having been described in detail heretofore, it is necessary only to bear in mind that the cams 45 to 52 inclusive are always, at the beginning of each operation of the machine, disposed at the outer limits of their movement and that the cam member 17 is then disposed in the position of Fig. 11. It is also to be borne in mind that the toothed clutch which associates the ring gear 14 with the shaft 65 is in mesh at the time that cam 17 is positioned as shown in Fig. 11 while the clutch 69—70 is at this time thrown out.

Depression of the treadle 110 performs two functions. First it throws the anti-friction roller 95 through the recess 96 into the path of the groove of the cam 94 and depresses the plunger 34 and plate 35 to clamp the work down upon the ejector plate via the link 41 and crank-shaft 39, and second, it throws the roller 98 out of engagement with the cam-plate 97, thus throwing in the clutch 69—70 to thereby cause the shaft 65 to begin rotation.

The treadle 110 is then released, the roller 95 being now engaged in the groove of the cam 94 and holding the presser plate down. Release of the treadle also permits the roller 98 to drop back into the path of rotation of the cam-plate 97 but, obviously, the clutch 69—70 will remain engaged until said cam plate again reaches and engages said roller to actuate the bell-crank lever controlling the said clutch. This occurs practically simultaneously with the spring return of the roller 95 from engagement with the cam 94 so that, after a single complete revolution of the cam 94, the mechanism automatically stops.

But during this revolution the face cam 90—91 of the worm-wheel will have twice thrown out the tooth-clutch to interrupt rotation of the ring-gear 14 and cam 17 and during these periods of interrupted rotation, the cam 114 will raise the plunger 27 for compressing the work successively against the respective sets of cams 45—48 and 49—52.

The ejector plate is then operated to eject the finished product, new blanks are inserted and the foregoing operation repeated.

It will be obvious that the inward movements of the cams 45 to 52 inclusive are substantially radial with respect to the axis of the recess in which the plate 24 and covering material 25 are received and that, by reason of the successive inward movements of said cams, the up-turned marginal edge portion of the covering material will be folded in bit by bit. As the marginal portion is coated with plastic adhesive and is, consequently moist, it lends itself readily to folding in and gathering, the latter being accordingly nicely distributed without becoming bunched appreciably at any point. The upward movement of the plunger 27 does not exceed one-eighth of an inch so that it will be apparent that the folded in marginal portion of the covering 25 will be lying almost flatly upon the opposed marginal portion of the plate 24 preparatory to each compression stroke of said plunger.

I claim as my invention:

1. A machine of the kind specified including a table element containing a receptacle of substantially the shape and size of a plate to be covered, a plunger for forcing a plate and covering material therefor into said receptacle to thereby upturn the marginal edge of the latter, a series of folding-in cams disposed around said receptacle, a rotatable member associated with said cams for forcing the same successively inwardly to thereby fold the said marginal portion into overlapping relation to the plate, and means associated with said cams for compressing said marginal portion upon said plate following the inward movement of said cams.

2. A machine of the kind specified including a table element containing a receptacle of substantially the shape and size of a plate to be covered, a plunger for forcing a plate and covering material therefor into said receptacle to thereby upturn the marginal edge of the latter, a plurality of sets of folding-in cams arranged around said receptacle, mechanism for moving each set successively inwardly to cause said marginal portion to overlap the said plate, and mechanism for compressing the plate intermittently against each set of said cams while the latter is disposed in inward position.

3. In a machine of the kind specified, a receptacle of the shape and size of the plate to be covered, a reciprocable plunger of said shape and size disposed within said receptacle, an opposed reciprocable plunger adapted to force the plate and covering material into said receptacle and coacting with the first-named plunger to hold the same in place, reciprocable spring-held members disposed about said receptacle, means for forcing the same successively inwardly to overhang the plate, coacting means on said members for retaining those first moved inwardly against retraction until the last thereof is released, and means for actuating said first-named plunger to compress the plate and covering material against said members while the latter are disposed in overhanging relation to the plate.

4. A machine of the kind specified including a table element containing a receptacle of substantially the shape and size of a plate to be covered, a plunger for forcing a plate and covering material therefor into said receptacle to thereby upturn the marginal edge of the latter, a plurality of sets of folding cams arranged about said receptacle and movable inwardly to project over the marginal edge portion of the contained plate to thereby fold in the marginal portion of the covering, a rotatable member adapted to successively move inwardly the cams of each set, a reciprocable plunger opposed to the first-mentioned plunger and arranged to press the plate upwardly to compress the marginal portion of the covering material against the inwardly projecting cams of the several sets successively, and means for effecting retraction of the cams of one set as the first cam of the next set is moved inwardly.

5. In a machine of the kind specified, a table element provided with a recess of the shape and size of a plate to be covered and adapted to receive a plate to be covered and covering material therefor, a vertically reciprocable plunger including a plate snugly fitting said recess and disposed therein, an ejector plate disposed above and operable independently of said plunger, a plurality of sets of folding-in cams arranged around said receptacle, each set comprising a plurality of said cams normally spring-held at the outer limits of their movement and movable substantially radially inwardly with respect to the axis of said recess to overhang the marginal portion of the contained plate, a rotatable cam associated with said sets of cams for forcing first the cams of one set and then the cams of the succeeding set successively inwardly, coacting means on the cams of each set whereby each cam of the set will be held against retraction by the next succeeding cam of said set, and mechanism for actuating said rotatable member and said first-named plunger synchronously to interrupt rotation of said member as the last cam of each set is moved inwardly and cause a movement of said plunger during the interval of rest of said rotatable member to effect compression of a marginal portion of the plate against the inwardly projecting cams.

6. In a machine of the kind specified, a table element provided with a recess of the shape and size of a plate to be covered and adapted to receive a plate to be covered and covering material therefor, a vertically reciprocable plunger including a plate snugly fitting said recess and disposed therein, an ejector plate disposed above and operable independently of said plunger, spring-held means disposed about the mouth of said recess and adapted to be moved to project inwardly beyond the peripheral wall of said recess, mechanism for so moving said means, devices associated with said means and said mechanism for retaining said means in inward position, springs for retracting said means at predetermined intervals, and a member associated with said means and said mechanism for forcing the plate contained in said recess to bear upon said means while the latter are in inward position.

7. In a machine of the kind specified, a table element provided with a recess of the shape and size of a plate to be covered and adapted to receive a plate to be covered and covering material therefor, a vertically reciprocable plunger including a plate snugly fitting said recess and disposed therein, a plurality of spring-held members arranged around the mouth of said recess and reciprocable substantially radially with respect to the axis of said recess, a rotatable cam associated with said members for successively causing the latter to project beyond the peripheral wall of said recess, means for preventing spring retraction of said members following inward movement thereof until a given one thereof shall have been passed by said cam, mechanism for actuating said cam at predetermined intervals and interrupting its rotation following inward movement of the last-mentioned cam, said mechanism operatively associated with said plunger to actuate the same during certain intervals of rest of said cam, and manually controlled means included in said mechanism for causing rotation of said cam and limiting said rotation to a single revolution.

8. In a machine of the kind specified, a member provided with a recess corresponding in shape and size with that of a plate to be covered, means for forcing and retaining a plate and covering in said recess, normally spring-retracted means associated with said member for folding in the marginal portion of covering to overlap said plate, a cam associated with said means for actuating the same against the spring retraction thereof, mechanism for relatively rotating said cam and member, manually operable means controlling said mechanism for setting the same in motion, a device associated with said folding-in means for pressing the plate against the latter at intervals, coacting means in said mechanism for effecting interruption of relative movement of said cam and member during the intervals of actuation of said device, elements included in said mechanism for automatically stopping said mechanism after the said cam and member shall have made one complete revolution relatively to each other, and simultaneously with such stoppage effect release of the forcing and retaining means to permit removal of the finished product from said recess.

9. A machine of the kind specified including a plurality of sets of cams for folding in the marginal portion of a cover sheet upon a plate to be covered, a single member for successively operating said sets of cams to effect said turning in, interengaging means on the cams of each set for retaining them in overlapping position relatively to the marginal portion of the cover plate until the last engaged cam of each set is released, mechanism for actuating said member at intervals and causing it to stop while engaged with said last cam of each set, mechanism for pressing the plate against said overlapping cams during intervals of rest of said member, a driving mechanism common to said member and said means, and manually actuated mechanism controlling the association of said driving mechanism with said means.

10. A machine of the kind specified including devices for turning in the marginal portions of covering material upon a plate, springs normally maintaining said members out of overlapping relation to said plate, a power actuated intermittently movable member for successively actuating said devices and maintaining each thereof in said overlapping position during a period of rest of said member, power actuated means for pressing the plate against the overlapping devices during said intervals of rest of said member, automatically released means for associating said member and said means with a source of power, and manually operable means for initially associating the same with said source of power.

11. In a machine of the kind specified, a plurality of means for turning in portions of the marginal edges of the cover-paper of a plate, a power actuated intermittently operating device for successively actuating said means and holding the same in inward position for a time interval, power actuated mechanism operative alternately with said device for effecting pressure of inturned portions of cover paper against the plate to be covered, a source of power common to said device and said mechanism and normally disengaged therefrom, manually actuated means for initially associating said device and said mechanism with said source of power, and means interposed in said association for alternately disassociating said device and said mechanism from said source of power.

12. In a machine of the kind specified, alternately operable independent mechanisms for turning in the marginal edges of adhesive coated material to overlap the marginal edges of the member to be covered, and for compressing the turned in portions of said material against said member, respectively, a source of power common to both said mechanisms normally disassociated therefrom, manually operable means for initially associating said mechanisms with said source of power, and means interposed in said association for automatically alternately actuating said mechanisms, and thereafter automatically disassociating the latter from said source of power.

13. In a machine of the kind specified, alternately operable indepenedent mechanisms for successively turning in predetermined marginal edge portions of adhesive coated material to overlap the marginal edges of the member to be covered until the entire marginal edges of said member are overlapped thereby, and for successively compressing the successively turned-in portions of said material against said member, respectively, a source of power common to both said mechanisms normally disassociated therefrom, manully operable means for initially associating said mechanisms with said source of power, and means interposed in said association for automatically alternately actuating said mechanisms, and thereafter automatically disassociating the latter from said source of power.

14. In a machine of the kind specified, alternately operable independent mechanisms for turning in the marginal edges of adhesive coated material to overlap the marginal edges of the member to be covered, and for compressing the turned-in portions of said material against said member, respectively, a source of power common to both said mechanisms normally disassociated therefrom, clutches for controlling the association of said mechanisms with said source of power, mechanism associated with said clutches for automatically alternately associating and disassociating said respective mechanisms with said source of power, and manually operable means for initially associating the source of power with said several mechanisms.

15. In a machine of the kind specified, alternately operable independent mechanisms for successively turning in predetermined marginal edge portions of adhesive coated material to overlap the marginal edges of the member to be covered until the entire marginal edges of said member are overlapped thereby, and for successively compressing the successively turned in portions of said material against said member, respectively, a source of power common to and normally disassociated from both said mechanisms, clutches for controlling the association of said mechanisms with said source of power, mechanism associated with said clutches for automatically alternately associating and disassociating said respective mechanisms with said source of power, and manually operable means for initially associating the source of power with said several mechanisms.

16. In a machine of the kind specified, alternately operable independent mechanisms for successively turning in predetermined marginal edge portions of adhesive coated material to overlap the marginal edges of the member to be covered until the entire marginal edges of said member are overlapped thereby, and for successively compressing the successively turned-in portions of said material against said member, respectively, a source of power common to and normally disassociated from both said mechanisms, normally released clutches for controlling the association of said mechanisms with said source of power, mechanism associated with said clutches for automatically alternately associating and disassociating said respective mechanisms with said source of power, and manually operable means for initially associating the source of power with said several mechanisms, said mechanism for operating said clutches including means for automatically disassociating the source of power from said clutches controlling said first-named mechanisms and stopping the latter at predetermined positions.

LOUIS TACKE.